United States Patent [19]
Lieb et al.

[11] 3,856,642
[45] Dec. 24, 1974

[54] METHOD FOR ELECTROSANITIZING WASTE WATER

[75] Inventors: Donald F. Lieb, Mentor; Neil W. Stillman, Madison, both of Ohio

[73] Assignee: Diamond Shamrock Corporation, Cleveland, Ohio

[22] Filed: June 21, 1973

[21] Appl. No.: 372,085

[52] U.S. Cl..................... 204/149, 210/62, 210/152
[51] Int. Cl............................. C02b 1/82, C02c 5/12
[58] Field of Search ............ 204/149, 152; 210/152, 210/198, 62

[56] References Cited
UNITED STATES PATENTS

| | | | |
|---|---|---|---|
| 1,095,893 | 5/1914 | Landreth | 204/149 |
| 1,146,942 | 7/1915 | Landreth | 204/149 |
| 1,544,052 | 6/1925 | Avery | 204/149 |
| 3,568,215 | 3/1971 | Riedel et al. | 4/10 |
| 3,586,627 | 6/1971 | Gooch | 204/149 X |
| 3,734,291 | 5/1973 | Schondelmyer | 210/152 |
| 3,755,827 | 9/1973 | Riedel et al. | 204/151 X |

Primary Examiner—T. Tung
Assistant Examiner—A. C. Prescott
Attorney, Agent, or Firm—Timothy E. Tinkler; Roy Davis

[57] ABSTRACT

A process for oxidizing and disinfecting waste water comprises providing an alkali metal chloride-containing waste water to a first container wherein it is agitated and macerated and electrolyzing at least a portion of said waste water to produce chlorine therein, followed by transfer to a second container wherein it is further agitated and, optionally, electrolyzed, prior to discharge. An apparatus suited to conducting the process is described.

4 Claims, 2 Drawing Figures

PATENTED DEC 24 1974          3,856,642

METHOD FOR ELECTROSANITIZING WASTE WATER

BACKGROUND OF THE INVENTION

Owing to recently increased concern over sewage-caused water pollution of streams, lakes, and seaways, legislation has and will be passed by both state and federal authorities forbiding the discharge of untreated or insufficiently treated waste water, e.g., the Federal Water Pollution Control Act Amendment of 1972. Therefore, an urgent need exists for a process and apparatus that will provide proper treatment of waste water prior to discharge.

By proper treatment of waste waters, especially those containing human wastes, it is understood that an ability to reduce or eliminate the biochemical oxygen demand (BOD), the chemical oxygen demand (COD), the bacteria content, and offensive odors is required. A compact, easy to operate, apparatus adapted for installation in boats, recreational vehicles, and the like, is especially to be desired.

Several apparatus have been propsed for such treatment of waste water but none have to date proven satisfactory. In one type, the waste water is treated with chlorine gas. However, the inherent toxicity of chlorine gas and the problems of storing and handling the bulky gas cylinders are very significant disadvantages of this method. Treatment by the addition of sodium hypochlorite (bleach) solutions has also been advocated but chemical deterioration of the bleach solution with time and during storage reduces treatment effectiveness, often without knowledge of the operator.

STATEMENT OF THE INVENTION

Therefore, it is an object of the present invention to provide a process for the simple and efficient oxidation and disinfection of waste water.

It is a further object of the present invention to provide a process for the treatment of waste water which eliminates the need for storage and handling of corrosive and/or unstable chemicals.

It is a still further object of the present invention to provide a compact, efficient, apparatus for the treatment of waste water.

These and further objects of the present invention will become apparent to those skilled in the art from the specification and claims that follow.

There has now been found a process for the treatment of aqueous waste water, which process comprises:
 a. providing an alkali metal chloride-containing waste water to a first container;
 b. agitating and macerating said waste water whereby any solids contained therein are comminuted;
 c. while agitating and macerating, subjecting at least a portion of said waste water to electrolysis whereby chlorine is produced;
 d. transferring the thus-treated waste water to a second container wherein it is further agitated; and
 e. removing the thus-purified water from said second container.

The process is particularly effective wherein at least a portion of the waste water in the second container is also subjected to electrolysis.

The process is preferably performed in an apparatus which comprises:
 a. a primary treatment container adapted for receipt of waste water and an alkali metal chloride and having disposed therein,
   1. a combination agitator and macerator for any solids suspended in said waste water and
   2. an electrode pack containing at least one anode and cathode and connected to a direct current source external said container;
 b. a secondary treatment container having an agitator disposed therein and an outlet for treated water; and
 c. means for transporting partially-treated waste water from said primary container to said secondary container.

An especially preferred apparatus also contains an electrode pack in said secondary container.

DESCRIPTION OF THE PREFERRED EMBODIMENTS

Figure 1:
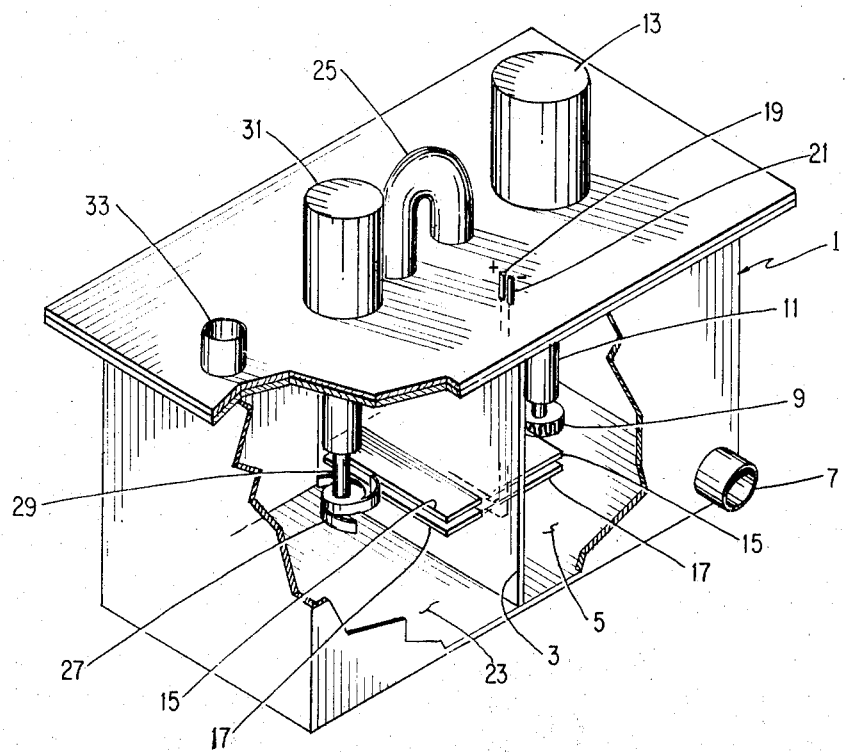
FIG. 1 is a perspective view, partially cut away, of a preferred electrosanitizer apparatus according to the present invention.

The alkali metal chloride-containing waste water that is treated according to the present invention will be understood to encompass a solution and/or suspension of human excreta, i.e., urine and/or feces, in an aqueous alkali metal, usually sodium but possibly potassium, chloride, hereinafter sodium chloride. The concentration of sodium chloride in solution is not critical to the present invention since a high electrochemical efficiency is not necessary. However, amounts within a range of from 20 to 40 grams per liter are typical. The use of larger amounts is essentially uneconomic, being a waste of salt, while lower amounts may not provide the necessary generation of chlorine and can lead to premature anode failure. Preferably, sea water will be employed where available and may serve as the flushing medium and electrolyte without further addition or treatment. Where sea water is not readily available, the addition of common salt to the waste water, either before or after entry to the primary treatment container, is contemplated.

In the process of the present invention, the alkali metal chloride-containing waste water is introduced at the prevailing temperature to a first container wherein it is agitated and macerated. Macerating obviously serves to reduce any solids contained in the waste water to a finely-divided form, more readily subject to oxidation and disinfection. While agitation and maceration proceed, typically for a period of time on the order of 1 to 3 minutes, at least a portion of the waste water passes between opposed electrodes in the container, which electrodes have applied thereto a direct current sufficient to generate chlorine at the anode. Under such conditions, the chlorine is immediately converted to hypochlorous acid, the predominant treating agent. It will be appreciated, however, that oxygen, ozone, sodium hypochlorite, chloramines, and the like, may also be formed and enter into the desired disinfecting reactions. In any event it has been found that in situ created disinfecting agents are more effective than added chemicals in waste water treatment.

Subsequently, the partially-treated waste water, now substantially reduced in BOD, COD, bacterial content, and odor, is transferred to a second container wherein it is subjected to further agitation. The thus-purified water is then removed from the second container and may be discharged into the surrounding water or other suitable receiving area. Since the process results in a significant reduction in COD and BOD and a substantially complete kill of E. coliform bacteria, which indicates destruction of pathenogenic organisms, such discharge is unobjectionable. This is especially true in the preferred embodidment wherein at least a portion of the waste water contained in the second container is also subjected to chlorine-producing electrolysis.

In practical operation, the first container will be of sufficient size to accommodate the effluent from at least one flushing of the attendant toilet facility. For this reason, subsequent to agitation, maceration, and electrolysis, the waste water may be allowed to stand in said first container until such a time as subsequent uses of the toilet facility force the partially-treated waste water into the second container. In this manner, a holding period is provided for chemical action on the wastes. Likewise, the second container generally has a capacity in excess of one flush load, thereby providing a second holding period, especially useful wherein additional electrolysis has taken place. Typically, as a matter of convenient operation, electrolysis and agitation will proceed in each container simultaneously and for a like period of time.

Figure 2:
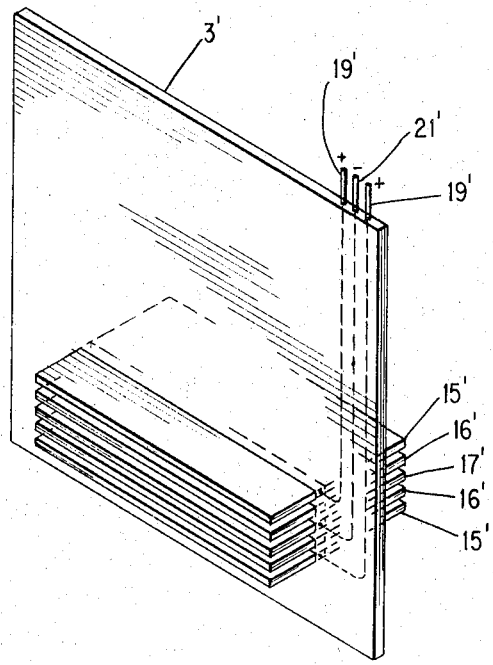
FIG. 2 is a perspective view of a bipolar electrode pack common to the two containers of a further preferred apparatus of the present invention.

FIGS. 1 and 2 relate to a preferred embodiment of the present invention wherein the primary and secondary treatment containers are comprised of a single vessel and separated by a liquid-tight partition. Of course, it is contemplated that separate vessels may comprise each container. Various other configurations may suggest themselves to those skilled in the art, bearing in mind the requirement in most instances for a compact installation adjacent the toilet facility.

In FIG. 1, the vessel 1, generally rectangular in shape and constructed of any suitable insulating and corrosion resistant material, such as polyvinyl chloride, is divided into tow containers of approximately equal size by an insulating and water-tight partition 3. The first, or primary, treatment container 5 is provided with an inlet 7 adapted for connection to the effluent line of a toilet facility. Disposed within container 5 is a macerator blade 9 depending via shaft 11 from an externally situated motor 13. The macerator, or cutting, blade 9 also serves to agitate the waste water within container 5. The motor 13 is a conventional electric motor sized to achieve the desired rotation speed depending upon the size of the apparatus in question. A blade speed on the order of 5,000 to 7,000 revolutions per minute is preferred.

Also disposed in container 5 is the electrode pack, consisting of at least one anode 15 and cathode 17 mounted on partition 3. These electrodes are preferably horizontally disposed to minimize interference with waste water circulation and to provide an additional cutting edge for solids breakup. The surface area of these electrodes and the number thereof disposed in the container may be varied to provide the necessary amount of generated chlorine, depending upon power supply available, size of the container, and the like. While a variety of methods of mounting are available, when, as in the preferred embodiment, the electrodes are common to both containers, it is convenient that the electrodes extend through the partition 3, in the manner shown best in FIG. 2. The electrode leads 19 (positive) and 21 (negative) may then also be cast in the partition and extend without the cell.

The anodes 15 are preferably dimensionally stable anodes, typically titanium or a similar metal covered with an electrically conductive, electrocatalytically active coating, such as a platinum group metal, platinum group metal oxide, or other coating known to the art to be effective and long-lived in a chlorine discharge environment. The base metal itself may be either a continuous or a foraminous sheet.

The cathodes 17 may be of like composition and configuration or, in many instances, need not be coated, a bare titanium surface, for example, comprising an effective cathode. Other electrolytically active but chemically and mechanically inert metals may be employed.

The distance between opposed anodes and cathodes is somewhat dependent upon the current available for electrolysis and the concentration of alkali metal chloride in the waste water. Typically, 25–a 25  30 gpl sodium chloride concentration and a 12 volt power supply, an electrode gap of 5 millimeters is preferred.

It should be understood that while the electrode arrangement shown is monopolar, with a greater number of electrodes, it is possible and often preferred, because of the increased power utilization efficiency possible, to establish bipolar operation wherein opposed sides of the same electrode serve as anode and cathode between terminal electrodes of opposite charge. Such an arrangement is best demonstrated in FIG. 2 wherein the electrode pack is shown to extend through partition 3' and consist of two terminal anodes 15', an intermediate cathode 17', and a pair of bipolar electrodes 16', with the appropriate electrode contacts 19' and 21' extending through and from the partition. Alternatively, with the proper electrical connections, each electrode may be of opposite polarity on opposite sides of the partition to provide a different bipolar configuration.

Typically, anode current densities on the order of one ampere per square inch will be employed.

The liquid communication between primary treatment container 5 and secondary treatment container 23 is by means of an inverted "U" crossover tube 25, although alternate means, such as a check valve through the partition of an arrangement of baffles positioned to provide circuitous or restricted access from the first to the second containers, are contemplated. The "U" crossover arrangement has the advantage of allowing light solids to pass through the system without introducing significant amounts of untreated wastes to the secondary container. When container 5 is filled, the pressure of incoming waste water forces partially-treated waste water through the crossover 25 and into container 23 wherein it is held. To facilitate further treatment, there is disposed in container 23 agitator means, typically comprising an agitator blade 27 on a shaft 29 dependent from motor 31 housed exterior the container. Motor size is selected to give speeds within the container on the order of 1,000 to 2,000 rpm. In the preferred embodiment shown, there is also disposed in container 23 the optional electrode pack of anode 15 and cathode 17. The same considerations as to size, materials of construction, disposition, and the like, apply as above. Finally, an outlet 33 is provided from which fully treated waste water is removed, generally by the pressure exerted in container 5 by incoming waste water.

Materials of construction not specified will obviously be those chosen to be resistant to temperatures, corrosive conditions, and the like, found in use.

In order that those skilled in the art may more readily understand the present invention and certain preferred embodiments by which it may be carried into effect, the following specific examples are afforded wherein the analytical methods employed are those described in the text "Standard Methods for the Examination of Water and Waste Water", American Public Health Association, Inc., New York (12th Edition, 1965) at: COD, Part IV, page 510; BOD, Part III, page 415; and coliform, Part VII, page 610.

EXAMPLE 1

The apparatus employed is of the type shown in FIG. 1, with the electrode configuration of FIG. 2, each container having a capacity of about 6 liters. Two anodes, one cathode, and two bipolar electrodes are employed, common to each container through the intervening partition. Each toilet flush cycle provides about 2.0 liters of waste water containing 28 gpl sodium chloride at ambient temperature. The agitator/macerator, agitator, and electrodes in their respective containers are operated simultaneously and for a period of about 2.5 minutes following receipt of fresh waste water. The average anode current density is 1.0 asi between electrodes spaced 5 mm apart and at a total electrode current of 22 amperes. Table 1 indicates the bacteriocidal effectiveness of the process and apparatus at the indicated time intervals over a two-day period.

TABLE 1

| Day | Time | Urination Defecation | Discharge Coliform* (count/100 ml) |
|---|---|---|---|
| 1 | 0845 | D | 0 |
|   | 0900 | U | - |
|   | 0925 | U | - |
|   | 0940 | D | - |
|   | 1000 | U | 0 |
|   | 1020 | D | - |
|   | 1050 | U | - |
|   | 1110 | U | 2200 |
|   | 1250 | D | 100 |
|   | 1300 | D | - |
|   | 1320 | U | - |
|   | 1340 | U | - |
|   | 1415 | U | 0 |
|   | 1505 | U | 0 |
|   | 1555 | U | 0 |
| 2 | 0830 | D | 0 |
|   | 0840 | U | - |
|   | 0915 | U | - |
|   | 0955 | D | 0 |
|   | 1030 | U | - |
|   | 1050 | U | 0 |
|   | 1200 | D | - |
|   | 1205 | U | - |
|   | 1225 | D | 0 |
|   | 1245 | U | - |
|   | 1320 | U | - |
|   | 1330 | U | 0 |
|   | 1430 | D | - |
|   | 1505 | U | 0 |
|   | 1530 | D | - |

*Typical before treatment equals 24 × 10⁶/100 ml.

From the foregoing table, it may be seen that random sampling shows that all or substantially all of the coliform bacteria are destroyed. Even on an average, the results are well within compliance with current standards of 1,000 counts per 100 ml. In addition, the only effluent odor is that of excess disinfectant and any contained solids are finely-divided and inoffensive.

EXAMPLE 2

Random samples taken after treatment according to the process and apparatus described in Example 1 are analyzed for BOD, COD, and coliform count, as indicated in Table 2 below. Typical before treatment $BOD_7$ values range to 4,700 milligrams per liter while typical COD values range to 16,300 mg/l. Initial coliform count is as in Example 1.

TABLE 2

| Sample No. | After Treatment | | |
|---|---|---|---|
|  | $BOD_7$ (mg/l) | COD (mg/l) | Coliform Count/100 ml |
| 1 | 1900 | 7100 | 0 |
| 2 | 1580 | 8100 | 0 |
| 3 | 1650 | 8600 | 100 |
| 4 | 2020 | 7500 | 0 |

A substantial reduction in all values and essentially complete elimination of coliform bacteria from the waste water are readily evidenced.

We claim:

1. A process for the treatment of waste water, which process comprises:
   a. providing a batch of an alkali metal chloride-containing waste water to a first container;
   b. agitating and macerating said waste water whereby any solids contained therein are comminuted;
   c. while agitating and macerating, subjecting said waste water to electrolysis whereby chlorine is produced;
   d. halting said agitation, maceration, and electrolysis;
   e. subsequently, by means of a second batch of alkali metal chloride-containing waste water, transferring the thus-treated waste water to a second container wherein it is further agitated and subjected to chlorine-producing electrolysis; and
   f. removing the thus-purified water from said second container by means of the introduction of a further batch to the first container.

2. A method as in claim 1 wherein the first container contains waste water and the second container contains partially-treated waste water and agitation, maceration, and electrolysis in the first container occur simultaneously with agitation in the second container.

3. A process as in claim 2 wherein electrolysis also occurs simultaneously in said second container.

4. A process for the treatment of waste water which comprises:
   a. providing an alkali metal chloride-containing waste water to a first container;
   b. providing a partially-treated, alkali metal chloride-containing waste water from said first container to a second container;
   c. agitating and macerating said waste water in said first container whereby any solids contained therein are comminuted;
   d. simultaneously agitating said partially-treated waste water in said second container whereby any particles contained therein are suspended;
   e. simultaneously subjecting said waste water in said first and second containers to electrolysis whereby chlorine is produced;
   f. halting said agitation, maceration, and electrolysis; and
   g. subsequently introducing waste water to be treated to said first container, said introduction causing the now partially-treated waste water in said first container to transfer to said second container and, in turn, the now completely-treated waste water in said second container to discharge.

* * * * *